United States Patent

[11] 3,630,218

| [72] | Inventor | John T. Parrett<br>Benton Harbor, Mich. |
| --- | --- | --- |
| [21] | Appl. No. | 21,255 |
| [22] | Filed | Mar. 20, 1970 |
| [45] | Patented | Dec. 28, 1971 |
| [73] | Assignee | Koehring Company |

[54] HOLDING VALVE
15 Claims, 5 Drawing Figs.

[52] U.S. Cl...................................... 137/87,
137/102, 137/106
[51] Int. Cl...................................... F16k 17/08
[50] Field of Search............................ 137/87,
102, 106, 487, 488, 490, 491, 625.2, 625.63;
91/420

[56] References Cited
UNITED STATES PATENTS

| 3,472,261 | 10/1969 | Brannon.................. | 137/102 |
| --- | --- | --- | --- |
| 3,411,521 | 11/1968 | Johnson.................. | 91/420 |
| 2,837,106 | 6/1958 | Bauer..................... | 137/106 |

*Primary Examiner*—Samuel B. Rothberg
*Assistant Examiner*—William H. Wright
*Attorney*—Hofgren, Wegner, Allen, Stellman & McCord

ABSTRACT: A counterbalance holding valve assembly for controlling the flow of fluid from a piston and cylinder device and thereby controlling movement of the piston and cylinder device including a first stage counterbalance valve having a low sensitivity for throttling flow in a controlled fashion from the piston and cylinder device and a second stage valve having greater sensitivity than the first stage valve that also functions to control discharge flow from the cylinder device to increase the flow capacity of the counterbalance valve assembly without sacrificing stability and uniform load lowering, with the first stage valve having a relatively small flow area and the second stage valve having a relatively large flow area with the valves being constructed so that the first stage valve opens at lower control pressures and the second stage valve opens later as the pressure in the piston and cylinder device increases.

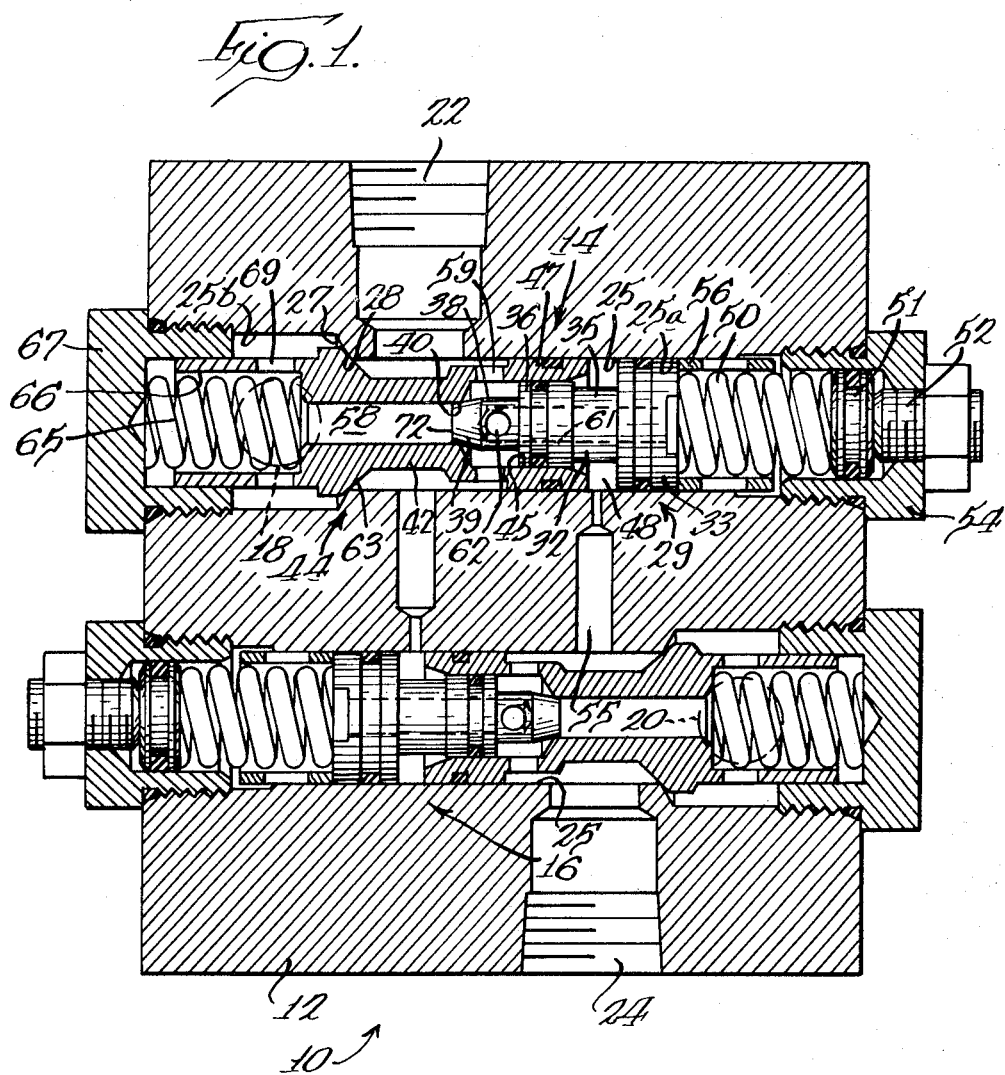

HOLDING VALVE

BACKGROUND OF THE PRESENT INVENTION

Counterbalance holding valves are well known in the valve art for serving the function of controlling the flow of hydraulic fluid from a reciprocating piston and cylinder device. Basically, the function of such valves is to restrict the outflow of hydraulic fluid from an actuator under the influence of an external load in a manner such that the load does not drive the actuator at a speed greater than indicated by the flow from the pump to the extending side of the actuator.

To effect this function, counterbalance holding valves are located in the discharge line connected with the side of an actuator which expels fluid during lowering of the load, for example when associated with a boom or the like. The counterbalance holding valve is arranged so that it closes in opposition to fluid pressure in the discharge side of the cylinder during load lowering so that discharge fluid pressure tends to open the valve. For the purpose of opposing this force of fluid and selectively maintaining the valve closed, a strong spring is provided urging the counterbalance valve to a closed position. Generally, a pilot piston arrangement is provided tending to open the valve and this communicates with fluid pressure associated with the extending side of the piston and cylinder device so that when fluid is supplied to the extending side, the counterbalance valve opens permitting discharge flow from the piston and cylinder device across the counterbalance valve and thus, permitting lowering of the load.

If a condition exists where the load tends to overrun the supply from the pump-supplying fluid to the extending side of the actuator, pilot pressure in the pilot piston device will decrease and the spring associated with the counterbalance valve will begin to close it. This produces a back pressure on the piston and cylinder device which reduces the speed of lowering and thus controls lowering to an acceptable level.

One of the problems in prior art holding valve assemblies is that they exhibit unstable characteristics in the sense that the incremental opening and closing movement of the counterbalance valve has been found to be high both with respect to changes in pilot fluid pressure and also with respect to changes in cylinder pressure. This stability of the valve is defined herein as valve sensitivity. It has been demonstrated that valves with high sensitivity to both control or pilot pressure and cylinder pressure tend to create load jerking during load lowering rather than smooth movement thereof which is obviously more desirable. While it has been found possible to design a counterbalance valve of low sensitivity, by providing a very small valve orifice, the capacity of such a valve is not acceptable in many applications.

It is therefore, a primary object of the present invention to provide a counterbalance holding valve assembly which has a low sensitivity to provide uniform load lowering while at the same time provide a valve having a high-flow capacity.

SUMMARY OF THE PRESENT INVENTION

In accordance with the present invention, a low-sensitivity counterbalance valve is provided which maintains uniform load lowering under cylinder pressure and control pressure fluctuations while at the same time permits high-capacity discharge from the piston and cylinder device associated with the load. Basically, this objective is achieved by providing a two-stage counterbalance valve assembly including a first stage having a very low sensitivity and a second stage having a higher sensitivity. The first stage opens first and serves to throttle discharge flow from the cylinders particularly with increasing cylinder discharge pressures. The second stage, which opens at a later time depending on the magnitude of fluid pressure supplied to the cylinder as well as cylinder discharge pressure, has a much larger flow area than the first stage valve and gives the valve assembly its high capacity characteristic.

Both of the valves tend to open in response to pilot pressure associated with the extending side of the piston and cylinder device in a manner similar to other counterbalance valves. For high-cylinder discharge pressures, indicating heavy load applications, the second stage valve is constructed to open at a later time (or upon excessive pressure, not at all) so that the first stage, low-sensitivity valve regulates movement of the actuator in a slow uniform manner. At lower cylinder discharge pressures, indicating the absence of a heavy external load applied to the actuator, the second stage valve will open sooner permitting freer discharge flow from the cylinder and more rapid lowering of the load.

Since the sensitivity of the valves according to the present invention is of significant importance it is believed helpful to define the term, "sensitivity," somewhat more precisely. Firstly, there are in actuality two sensitivity parameters which have primary significance in defining the characteristics of a counterbalance holding valve. These are the pilot pressure sensitivity, $S_p$, and the cylinder pressure sensitivity, $S_c$. As will be seen from the following equation, the term sensitivity may be defined as the valve opening, in square inches, for a 10 p.s.i. increment in pressure. The sensitivity equations are:

$$S_p = \frac{10 \times A_p \times \sin\theta \times C_s}{R_s}$$

$$S_c = \frac{10 \times A_c \times \sin\theta \times C_s}{R_s}$$

Where:
- $A_p$ = Pilot pressure area in valve, sq. in.
- $A_c$ = Cylinder pressure area (net) in valve, sq. in.
- $R_s$ = Spring rate, lb./in.
- $\theta$ = Poppet seat angle
- $C_s$ = Poppet seat circumf. in.

It can be readily seen from the above equations that as the area of the valve seat (proportional to $C_s$) increases, that the sensitivity of the valve increases and thus, if one desires a counterbalance valve having low sensitivity and good stability, one could provide a small valve area but this would obviously reduce the flow capacity of the valve.

Thus, the desirable characteristics of low sensitivity and high capacity seem inconsistent and impossible to incorporate into a single-holding valve assembly. This has been achieved, however, in the present device by the provision of a counterbalance valve having two stages, each with a different sensitivity.

BRIEF DESCRIPTION OF THE DRAWINGS

FIG. 1 is a cross section of a double counter balance holding valve assembly according to the present invention;

DETAILED DESCRIPTION OF THE PREFERRED EMBODIMENTS

Figure 3:
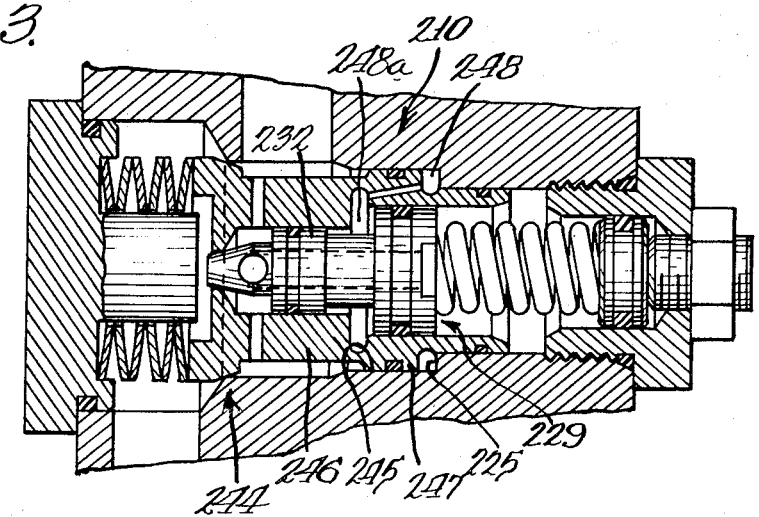
FIG. 3 is a fragmentary elevation of still another counterbalance valve assembly according to the present invention.

Referring to the drawings and particularly FIG. 1, a counterbalance valve assembly 10 is illustrated including a valve block 12 having a first counterbalance valve assembly 14 and a second counterbalance valve assembly 16 therein. The counterbalance valve 14 is adapted to control discharge from a passage 18 connected to one side of a reciprocating piston hydraulic actuator (not shown), while counterbalance valve 16 is adapted to control discharge flow from passage 20 associated with the opposite side of the hydraulic actuator.

Thus, the valve assembly 10 is adapted to control fluid from both sides of the hydraulic actuator, but it should be understood that the principles of the present invention are incorporated in each of the valves 14 and 16, and in fact frequently only one counterbalance valve is employed, since in many applications it is necessary to only control the fluid from one side of the actuator, e.g. the side of the actuator which discharges during load lowering. Counterbalance valves of this type are frequently used to control movement of hydraulic actuators in applications where the actuators may tend to be driven by a load under gravity, such as a load carrying boom or derrick or the like.

The valve block 12 is provided with ports 22 and 24 each of which may serve as either an inlet or a discharge passage depending upon whether hydraulic fluid is supplied to or drained from the ports.

A four-way control valve (not shown) is conventionally provided in such systems and employs selective outlet passages connected with the ports 22 and 24 in a manner such that when one port is pressurized with fluid from a pump, the other is connected to exhaust. Counterbalance valve 14 serves firstly the purpose of permitting forward flow to the cylinder when port 22 is pressurized. At the time port 22 is pressurized, counterbalance valve assembly 16 serves to control discharge flow from cylinder passage 20 to port 24 which is then connected to exhaust. Conversely, when port 24 is pressurized and port 22 connected to exhaust, counterbalance valve 16 permits the free flow of fluid to passage 20 while counterbalance valve 14 controls discharge flow from cylinder passage 18 to port 22 which is then connected to exhaust.

Since the counterbalance valves 14, 16 are identical in construction, a detailed description thereof will be made only with respect to the counterbalance valve 14. Formed within the valve block 12 is a transverse through passage 25 having a reduced portion 25a at one end and an enlarged portion 25b at the other end, there being provided therebetween a conical shoulder 27 defining a valve seat 28.

Located in the right end of valve bore 25 is a first stage valve 29 which includes a movable valve member 32 having an enlarged land 33 slidable in valve bore portion 25a, a reduced stem portion 35, a smaller land portion 36 and a valve portion 38 having a conical valve surface 39 engageable with a valve seat 40 formed in a valve member 42 associated with a second stage valve 44.

The smaller land portion 36 slidably engages a counterbore 45 in the right end of second stage valve member 42 which has a land portion 47 slidably engaging the valve bore portion 25a.

The land portion 47, along with land portions 36 and 33 on valve member 32, define in bore 25 a pilot chamber 48. Pilot fluid in chamber 48 acts on the area of valve member 32 defined between the seals on lands 36 and 33, urging the valve member 32 toward its open position against the opposing force of counterbalance spring 50 which is seated in the right end of bore portion 25a. Coil compression spring 50 engages land 33 at its left end and at its right end engages a spring seat 51 axially adjustable by a member 52 threaded into a cap 54 in the right end of bore 25. A sleeve 56 is provided in bore 25 for the purpose of limiting the rightward movement of valve member 32.

The spring 50 is sized so that it can, in the absence of pilot pressure, maintain the first stage valve 32 closed against the maximum acceptable fluid pressure in cylinder port 18. The pilot chamber 48 communicates with port 24 through a transverse pilot passage 55 and bore 25 associated with valve 16, so that the pilot chamber 48 is pressurized whenever port 24 is pressurized and port 22 connected to drain by the control valve described above. When pilot pressure is applied to chamber 48 the first stage valve member 32 will open permitting discharge flow from cylinder port 20, through axial passage 58 in valve member 42, across seat 40, through radial ports 59 in valve member 42 and out port 22.

The first stage valve member 32 has a central bore 61 therethrough communicating with a radial passage 62 in valve portion 38 for the purpose of providing communication between the right end of the spring chamber associated with spring 50 and port 22.

The second stage valve member 42 has an enlarged valve portion defining a conical valving surface 63 selectively engageable with seat 28 in bore 25. The second stage valve 44, as the first stage 29, controls communication between the cylinder port 18 and the port 22 across the valve seat 28. The valve seat 28, however, is larger than the valve seat 40 and thus the second stage valve 44 provides the greater flow path for discharge fluid from passage 18.

For the purpose of biasing the second stage valve member 42 to its closed position illustrated in FIG. 1, a coil compression spring 65 is provided seated within a counterbore 66 in the left end of valve member 44 and reacting against an end cap 67 threaded in the left end of bore 25. Apertures 69 are provided in the left end of the valve member 42 for the purpose of providing communication between the cylinder passage 18 and the central passage 58 in valve member 42 which is the discharge passage for the first stage valve 29.

The spring 65 is approximately 15 percent stronger than spring 50 for the purpose of normally holding the second stage valve member 42 in its closed position shown noting that spring 50 associated with the first stage valve member also reacts against valve member 42 through the first stage valve member 42 does not close in opposition to the force of fluid in the cylinder passage 18 as does the first stage valve member 32 which has a surface 72 continuously exposed to fluid pressure in cylinder passage 18.

Pilot fluid pressure in chamber 48 also serves to open the second stage valve 42 against the opposing force of the spring 65 as well as the force of cylinder pressure acting on the left end of the valve member 42 tending to close the valve. In the embodiment shown in FIG. 1, the area of valve member 42, upon which pilot pressure acts, is difference in area between the seals associated with lands 36 and 33 so that the effective pilot area is the same for both the first and second stage valve members.

As will be apparent in accordance with the above noted equations, the size of the valve seats 40, 28 the strength of the springs 50 and 65 and the pilot pressure areas defined in the pilot chamber 48 may be varied as desired to achieve the sensitivities of the first and second valve stages that best suit the application for which the valve assembly is designed.

An additional function of the second stage valve member 44 is that of a check valve in that it permits the free flow of hydraulic fluid from port 22, when pressurized, to the cylinder port 18. That is, the control valve is positioned to pressurize port 22 when forward flow to the cylinder passage 18 is desired and the resulting fluid pressure acting on valve member 42 opens the valve and permits flow from port 22 across seat 28 and out the cylinder port 18 pressurizing the associated side of the cylinder. Thus, the second stage functions both as a bypass valve during forward flow and a control valve for controlling discharge flow depending upon whether port 22 or port 24 is pressurized.

During operation, when the port 24 is pressurized and port 22 connected to exhaust, the counter balance valve 16 pressurizes port 20 supplying fluid to one side of the associated hydraulic actuator. Assuming that side of the actuator is the load lowering side, the contracting or discharge side of the actuator is connected to cylinder passage 18 associated with counterbalance valve 14. The pressure in passage 18 varies not only as a function of supply pressure to the actuator but also as a function of the assisting load on the actuator. That is, an increase in the external load will result in an increase in pressure in the cylinder passage 18, and if the load tends to overrun the actuator, a decrease in pressure will result on the opposite side of the actuator which communicates with the cylinder passage 20 so that the pressure in the pilot chamber 48 decreases upon the tendency of the load to overrun in an assisting direction.

Upon pressurization of port passage 20 across valve 16 the associated actuator will be pressurized in a load lowering direction tending to pressurize cylinder passage 18 and the end face 72 of the first stage valve. Simultaneously, chamber 48 is pressurized. The combined fluid pressure forces are sufficient to overcome the force of spring 50 and valve member 32 opens throttling flow from the port 18 through passage 58 to port 22 which then is a discharge port connected to exhaust. As the external load fluctuates, varying pressure in port 18 and in pilot pressure chamber 48, the valve member 32 will shift with respect to seat 40 to control discharge flow from passage 18 and maintain uniform movement of the actuator, free from jerking.

As the pressure in the associated cylinder continues to build up and a sufficient pressure is reached in pilot pressure chamber 48 (communicating therewith), pilot pressure acting on valve member 42 will open the valve in opposition to the force of spring 65 permitting fluid to discharge, not only across the first stage valve member 32, but across the second stage valve member 42 as well.

Figure 4:
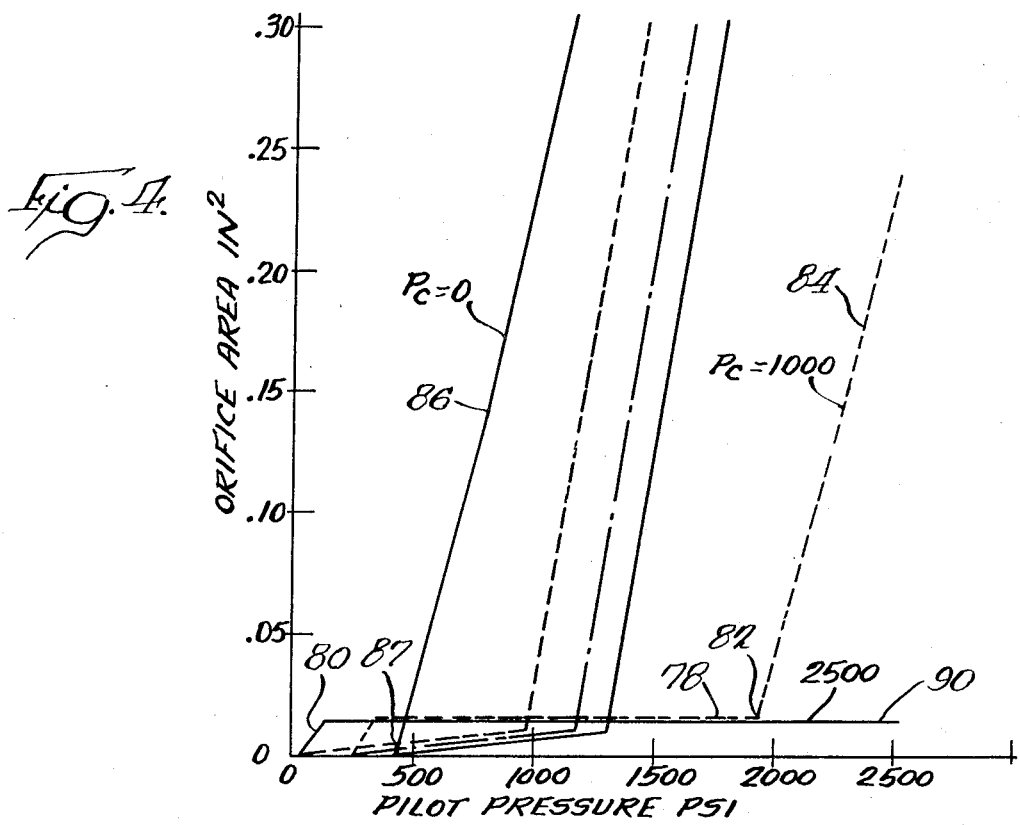
FIG. 4 is a graph illustrating valve opening with variations in pilot pressure.

Viewing FIG. 4 and curve 78 it is seen that for a given cylinder pressure, e.g. one thousand p.s.i., the area of the first stage valve 29 will increase rapidly as shown at 80 and then remain constant with increasing pilot pressure in chamber 48 until approximately 2,000 p.s.i. as shown at point 82. At point 82 the pressure in chamber 48 compared with the force of spring 65 and the cylinder pressure acting on the left end of the second stage valve member 42 is sufficient to open the valve 42 causing a rapid increase in the total discharge area defined by the first and second stage valve orifices as illustrated by curve portion 84. As shown by curve 86, with no pressure at passage 18 the second stage will open at point 87, below 500 p.s.i. pilot pressure in chamber 48. Thus, the second stage will open at a later time for higher cylinder discharge pressures as represented by the pressure in port 18. Since the first stage valve 29 has a lower sensitivity than the second stage valve, there is greater modulation of discharge flow for higher cylinder pressures because of this characteristic of the present valve.

An additional characteristic of the present valve is that with sufficient, or excessive, cylinder pressures in the discharge side of the cylinder, the second stage valve 44 will not open at all. That is, there is a sufficient fluid pressure in passage 18 that will prevent the opening of the second stage valve member by fluid pressure in pilot chamber 48. This is represented by curve 90 in FIG. 4 wherein the discharge flow at 2,500 p.s.i. cylinder pressure is seen to be controlled solely by the first stage valve which has a lower sensitivity and the second stage valve will not open at all.

Figure 5:
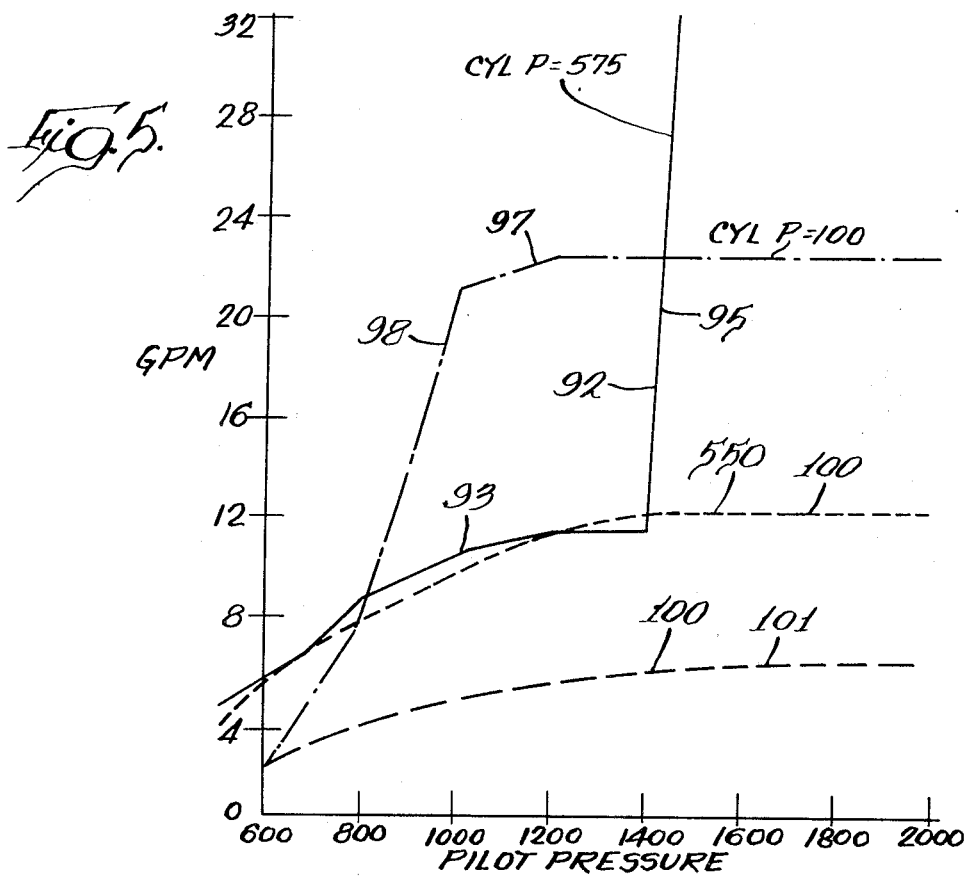
FIG. 5 is a graph showing discharge flow with variations in pilot pressure.

As seen by curve 92 in FIG. 5 the first stage modulates flow from the actuator at lower cylinder discharge flow rates as indicated by curve portion 93 while the second stage opens later as indicated by curve portion 95 and permits higher discharge flow. Moreover, with lower cylinder pressures such as indicated by curve 97 (e.g. 100 p.s.i.) the second stage will open sooner as indicated by curve portion 98 permitting greater discharge flow earlier with lower cylinder pressure than with higher cylinder pressure. THus, with a lighter external load the present counterbalance valve will open sooner permitting more rapid load movement, while with a heavier external load the first stage control valve will throttle discharge flow reducing and controlling the lowering of the load and permitting more uniform load movement. Curves 100 and 101 illustrate conventional counterbalance valve constructions having approximately the same sensitivity as that of stage one, and it is readily apparent that flow rates according to the present invention cannot be achieved in prior art devices. If the sensitivity of the prior valves was increased to achieve higher flow rates, very poor throttling of high-pressure flow would result in an unstable condition, chattering of the holding valve and jerking of the load.

Figure 2:
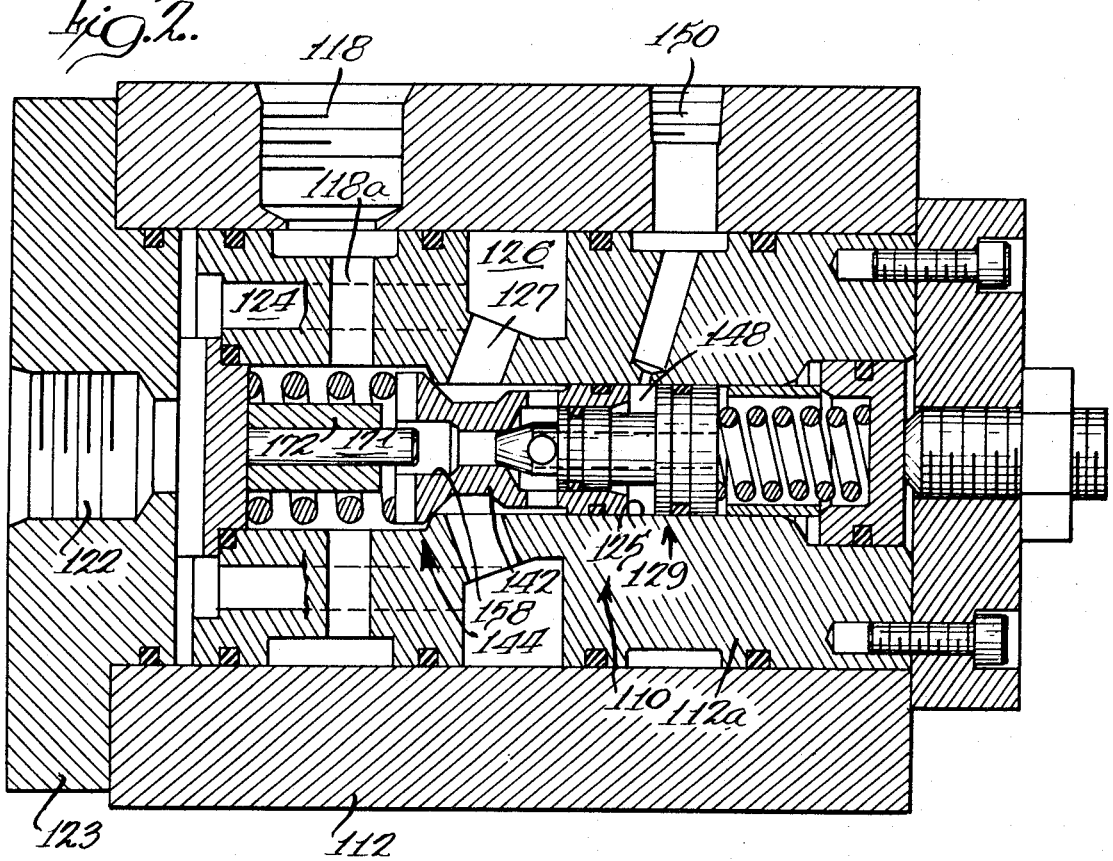
FIG. 2 is a cross section of another counterbalance holding valve assembly according to the present invention.

The holding valve illustrated in FIG. 2 is generally similar to that illustrated in FIG. 1 except that it is a single holding valve assembly 110 consisting of a first stage valve 129 and a second stage valve 144 of similar construction to those shown in FIG. 1. Rather than providing as integral valve block as in the FIG. 1 construction, the FIG. 2 construction includes an annular valve housing member 112 with an annular housing insert 112a. The holding valve 110 is connected to the associated control valve by port 122 in end cap 123, and this port communicates with the counterbalance valve through axial passages 124 in sleeve 112a, annular passage 126 and diagonal passages 127 which communicate with bore 125. The port adapted to be connected to the associated cylinder is port 118 which communicates with the left end of the second stage valve member through radial passages 118a. The port 150 communicates with the conduit which supplies fluid to the side of the actuator opposite to that which port 118 is connected, so that when the opposite side of the actuator is pressurized chamber 148 will be pressurized and the counterbalance valve 110 will open permitting discharge flow from port 118 to port 122.

Conversely, when port 122 is pressurized, the second stage valve 144 will open permitting forward flow to cylinder port 118 to reverse the actuator. Valve member 142 associated with the second stage has a stepped central aperture 158 which receives a stationary post 171 carrying a stop sleeve 172 which engages the end of the second stage valve member 142 to limit opening movement thereof. The operation of the counterbalance valve 110 is the same as that described with reference to valve 14 in FIG. 1 so that repetition is not believed necessary.

The counterbalance valve shown in FIG. 3 and indicated at 210 is similar to those described above and includes a first stage valve 229 and a second stage valve 244 with a second stage valve member 242 being somewhat enlarged over those shown in the FIGS. 1 and 2 embodiments. An additional difference is that a first pilot chamber 248 is defined between land 247 and stepped valve bore 225, and a second pilot chamber 248a is defined between stepped bore 245 inside the valve member 242 and first stage valve member 232. This difference in the FIG. 3 embodiment illustrates that the effective area of the first stage pilot as defined by chamber 248a may be different than the effective area defined by the second stage pilot (both chambers 248 and 248a). By varying the relative size of the first and second stage pilot areas, the sensitivity of the first and second stages may be varied. This, of course, is but one illustration of a means for varying the relative and absolute sensitivities of the first and second stages of the valves and it should be understood that variations in the other parameters noted above will also result in sensitivity changes of the valves.

I claim:

1. A counterbalance holding valve assembly, comprising; cylinder passage means adapted to be connected to one side of a piston and cylinder device, discharge passage means, pilot passage means adapted to communicate with the other side of the piston and cylinder device, first stage valve means for controlling the magnitude discharge flow from said cylinder passage means to said discharge passage means, said first stage valve means closing in opposition to fluid pressure in said cylinder passage means, said first stage valve means being urged in an opening direction by fluid in said pilot passage means and being responsive to pilot passage fluid pressure to modulate flow from the cylinder passage means to the discharge passage means, and second stage valve means constructed to open when the first stage valve means is open for controlling discharge flow from said cylinder passage means to said discharge passage means to increase the flow capacity at the valve assembly.

2. A counterbalance holding valve assembly as defined in claim 1, wherein said second stage valve means is urged in an opening direction by fluid pressure in said pilot passage means.

3. A counterbalance holding valve assembly as defined in claim 1, wherein said first stage valve means is constructed to open before said second stage valve means, with increasing pressure in said pilot passage means.

4. A counterbalance holding valve assembly as defined in claim 2, wherein said first stage is constructed to be less responsive to incremental changes in pressure in said pilot pressure passage than said second stage valve means.

5. A counterbalance holding valve assembly as defined in claim 1, wherein said first stage valve means is constructed to be less responsive to incremental changes in pressure is said cylinder passage means than said second stage valve means.

6. A counterbalance holding valve assembly, comprising: cylinder passage means adapted to be connected to one side of a piston and cylinder device, discharge passage means, pilot passage means adapted to communicate with the other side of the piston and cylinder device, a first stage valve controlling communication between said cylinder passage means and said discharge passage means and located so that fluid pressure in said cylinder passage means tends to open the first stage valve, first spring means tending to close the first stage valve in opposition to the force of fluid in said cylinder passage means, means responsive to fluid pressure in said pilot passage means tending to open the first stage valve, a second stage valve for controlling fluid discharge from said cylinder passage means to said discharge means, and means responsive to fluid pressure in said pilot passage means tending to open said second valve.

7. A counterbalance holding valve assembly as defined in claim 6, wherein said first valve has a valve seat, said second valve having a valve seat, the area of the first valve seat being smaller than the area of the second valve seat.

8. A counterbalance holding valve assembly as defined in claim 6, wherein said second valve permits the free flow of fluid from the discharge passage means to the cylinder passage means.

9. A counterbalance holding valve assembly, comprising: cylinder passage means adapted to be connected to one side of a piston and cylinder device, discharge passage means, pilot passage means adapted to communicate with the other side of the piston and cylinder device, a first stage valve controlling communication between said cylinder passage means and said discharge passage means and located so that fluid pressure in said cylinder passage means tends to open the first stage valve in opposition to the force of fluid in said cylinder passage means, means responsive to fluid pressure in said pilot passage means tending to open the first stage valve, a second stage valve for controlling fluid discharge from said cylinder passage means to said discharge passage means, and means responsive to fluid pressure in said pilot passage means tending to open said second valve, said second stage valve including a movable valve member, said movable member having a valve seat therein, said first stage valve including a movable valve member engageable with said seat in the second stage valve member, said valves opening in opposite directions of movement.

10. A counterbalance holding valve assembly, comprising: cylinder passage means adapted to be connected to one side of a piston and cylinder device discharge passage means, pilot passage means adapted to communicate with the other side of the piston and cylinder device, a first stage valve controlling communication between said cylinder passage means and said discharge passage means and located so that fluid pressure in said cylinder passage means tends to open the first stage valve in opposition to the force of fluid in said cylinder passage means, means responsive to fluid pressure in said pilot passage means tending to open the first stage valve, a second stage valve for controlling fluid discharge from said cylinder passage means to said discharge passage means, and means responsive to fluid pressure in said pilot passage means tending to open said second valve, said second valve permits the free flow of fluid from the discharge passage means to the cylinder passage means, and first spring means biasing both of said valve members in one direction and second spring means biasing both of said valve members in the other direction.

11. A counterbalance holding valve assembly as defined in claim 9, including a common pilot chamber between said valve members, said chamber communicating with said pilot passage means.

12. A counterbalance holding valve assembly as defined in claim 9, wherein one of said springs is stronger than the other to maintain the valves in a normally closed position without the application of fluid pressure.

13. A counterbalance holding valve assembly, comprising: cylinder passage means adapted to be connected to one side of a piston and cylinder device, discharge passage means, pilot passage means adapted to communicate with the other side of the piston and cylinder device, a first stage valve controlling communication between said cylinder passage means and said discharge passage means and located so that fluid pressure in said cylinder passage means tends to open the first stage valve, first spring means tending to close the first stage valve in opposition to the force of fluid in said cylinder passage means, means responsive to fluid pressure in said pilot passage means tending to open the first stage valve, and a second stage valve for controlling fluid discharge from the cylinder passage means to said discharge passage means, said second stage valve having a greater flow area than said first stage valve, said first stage valve being less responsive to fluid pressure changes than said second stage valve.

14. A counterbalance holding valve assembly as defined in claim 12, wherein said second stage valve is located to close in the direction of flow from said cylinder passage means to said discharge passage means, spring means urging said first stage valve closed, spring means urging said second stage valve closed, said second stage spring means being stringer than said first stage spring means.

15. A counterbalance holding valve assembly, comprising: cylinder passage means adapted to be connected to one side of a piston and cylinder device, discharge passage means, pilot passage means adapted to communicate with the other side of the piston and cylinder device, a first stage valve controlling communication between said cylinder passage means and said discharge passage means and located so that fluid pressure in said cylinder passage means tends to open the first stage valve, first spring means tending to close the first stage valve in opposition to the force of fluid in said cylinder passage means, means responsive to fluid pressure in said pilot passage means tending to open the first stage valve, a second stage valve for controlling fluid discharge from said cylinder passage means to said discharge passage means, and means responsive to fluid pressure in said pilot passage means tending to open said second stage valve, said first valve having a valve seat, said second valve having a valve seat, the area of the first valve seat being smaller than the area of the second valve seat, said second valve means permitting the free flow of fluid from the discharge passage means to the cylinder passage means, said second stage valve including a movable valve member, said movable valve member having a valve seat therein, said first stage valve including a movable valve member engageable with said seat in the second stage member, said valves opening in opposite directions of movement.

* * * * *